(12) United States Patent
Zhang et al.

(10) Patent No.: US 12,546,321 B2
(45) Date of Patent: Feb. 10, 2026

(54) ELECTRIC PUMP

(71) Applicant: ZHEJIANG SANHUA AUTOMOTIVE COMPONENTS CO., LTD., Zhejiang (CN)

(72) Inventors: Jun Zhang, Zhejiang (CN); Jundi Hu, Zhejiang (CN); Bingjiu Yin, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 0 days.

(21) Appl. No.: 18/716,954

(22) PCT Filed: Dec. 9, 2022

(86) PCT No.: PCT/CN2022/137935
§ 371 (c)(1),
(2) Date: Jun. 6, 2024

(87) PCT Pub. No.: WO2023/104189
PCT Pub. Date: Jun. 15, 2023

(65) Prior Publication Data
US 2024/0410370 A1    Dec. 12, 2024

(30) Foreign Application Priority Data
Dec. 10, 2021  (CN) .......................... 202111504942.X

(51) Int. Cl.
*F04D 13/06* (2006.01)
*H02K 5/22* (2006.01)
*H02K 15/14* (2006.01)

(52) U.S. Cl.
CPC ......... *F04D 13/0693* (2013.01); *H02K 5/225* (2013.01); *H02K 15/14* (2013.01)

(58) Field of Classification Search
CPC ...... F04D 13/06; F04D 13/0693; F04B 17/03; H02K 5/225; H02K 5/14
See application file for complete search history.

(56) References Cited

U.S. PATENT DOCUMENTS

| | | | |
|---|---|---|---|
| 2014/0099221 A1* | 4/2014 | Tanahashi | H02K 5/225 417/423.7 |
| 2020/0021160 A1* | 1/2020 | Kuratani | H02K 5/08 |

FOREIGN PATENT DOCUMENTS

| | | |
|---|---|---|
| CN | 102347667 A | 2/2012 |
| CN | 106655642 B | 1/2020 |
| CN | 212583960 U | 2/2021 |

(Continued)

OTHER PUBLICATIONS

International Search Report for PCT/CN2022/137935 mailed Feb. 11, 2023, ISA/CN.

(Continued)

*Primary Examiner* — Loren C Edwards
(74) *Attorney, Agent, or Firm* — Yue (Robert) Xu; Apex Attorneys at Law, LLP

(57) ABSTRACT

An electric pump includes a first housing, a stator assembly, and a pin. The first housing is injection-molded by using the stator assembly as an insert and fixed to the stator assembly by injection molding, and is provided with a pin hole for placing the pin. Thus, the fixation of a pump housing, the stator assembly and the pin is facilitated to be simplified.

15 Claims, 7 Drawing Sheets

(56) References Cited

FOREIGN PATENT DOCUMENTS

| | | |
|---|---|---|
| CN | 113969821 A | 1/2022 |
| CN | 217183066 U | 8/2022 |
| JP | 2013132143 A | 7/2013 |
| JP | 2015136280 A | 7/2015 |
| JP | 2016025847 A | 2/2016 |

OTHER PUBLICATIONS

European search report issued on Oct. 20, 2025 for European counterpart application No. 22903606.6.

* cited by examiner

ELECTRIC PUMP

The application is a National Phase entry of PCT Application No. PCT/CN2022/137935, filed on Dec. 9, 2022, which claims the priority of the Chinese Patent Application No. 202111504942.X, titled "ELECTRIC PUMP", filed on Dec. 10, 2021 with the China National Intellectual Property Administration, which is incorporated herein by reference in its entirety.

FIELD

The present application relates to a fluid pump, and in particular to an electric pump.

BACKGROUND

An electric pump includes a stator assembly, a pump housing and a pin, and the pin is configured for connecting with outside, so as to provide energy or a driving signal or a control signal for the electric pump. It is a technical problem to provide a simple fixing method for the pump housing, the stator assembly and the pin, since the fixing of the pump housing, the stator assembly and the pin is relatively complicated.

SUMMARY

An object of the present application is to provide an electric pump, which is beneficial to simplifying fixing of a stator assembly, a pump housing and a pin.

In order to achieve the above object, an embodiment of the present application adopts the following technical solution. An electric pump includes a stator assembly, a first housing and a pin, and the stator assembly includes a stator core, an insulating frame and a winding. The insulating frame covers at least part of a surface of the stator core, and a wire of the winding is wound around the insulating frame. The first housing covers at least part of the stator assembly, and the first housing is formed by injection molding with at least the stator assembly as an insert and is fixed to the stator assembly by injection molding. The first housing has an injection-molded pin hole, in which a fixing portion of the pin is located, and the wire is fixed and electrically connected with a wire hanging portion of the pin.

An assembling method for an electric pump is provided according to another embodiment of the present application, which is applied to the electric pump described above. The electric pump includes a stator assembly, a pin, a rotor assembly and a pump housing, and the pump housing includes an injection-molded body and a pump cover. The assembling method for the electric pump includes the following steps:

forming the injection-molded body with the stator assembly and the pin as inserts;
placing the rotor assembly in a rotor chamber of the injection-molded body;
fixedly connecting the pump cover and the injection-molded body.

According to the electric pump and the assembling method for the electric pump provided by the present application, the first housing is formed by injection molding with the stator assembly as the inserts and is fixed with the stator assembly by injection molding, and has the pin hole for placing the pin, which is beneficial to simplifying the fixing of the pump housing, the stator assembly and the pin.

DETAILED DESCRIPTION OF THE EMBODIMENTS

The present application is further illustrated hereinafter in conjunction with drawings and specific embodiments.

An electric pump in the following embodiment can provide flowing power for a working medium of a vehicle thermal management system, and the working medium is 50% aqueous solution of ethylene glycol or clean water. Certainly, the working medium may also be other substances.

Referring to FIG. 1 to FIG. 4, the electric pump 1000 includes a pump housing 1100, a rotor assembly 1200, a stator assembly 1300, and a pump shaft 16, and at least part of the rotor assembly 1200 is mounted outside an outer periphery of the pump shaft 16, and the rotor assembly 1200 is rotatably connected with the pump shaft 16. A pump chamber 1010 is formed in the pump housing 1100, and the rotor assembly 1200 is located in the pump chamber 1010. The pump chamber 1010 includes a rotor chamber 1011 and an impeller chamber 1012, which are in communication with each other. The rotor assembly 1200 includes a rotor 1220 and an impeller 1210. In this embodiment, the rotor 1220 includes a permanent magnet, and at least part of the rotor 1220 is located in the rotor chamber 1011 and the impeller 1210 is located in the impeller chamber 1012. When the electric pump 1000 is in operation, the rotor assembly 1200 rotates around the pump shaft 16 under an action of an excitation magnetic field by controlling the current of the stator assembly 1300 and then controlling the excitation magnetic field generated by the stator assembly 1300.

Figure 7:
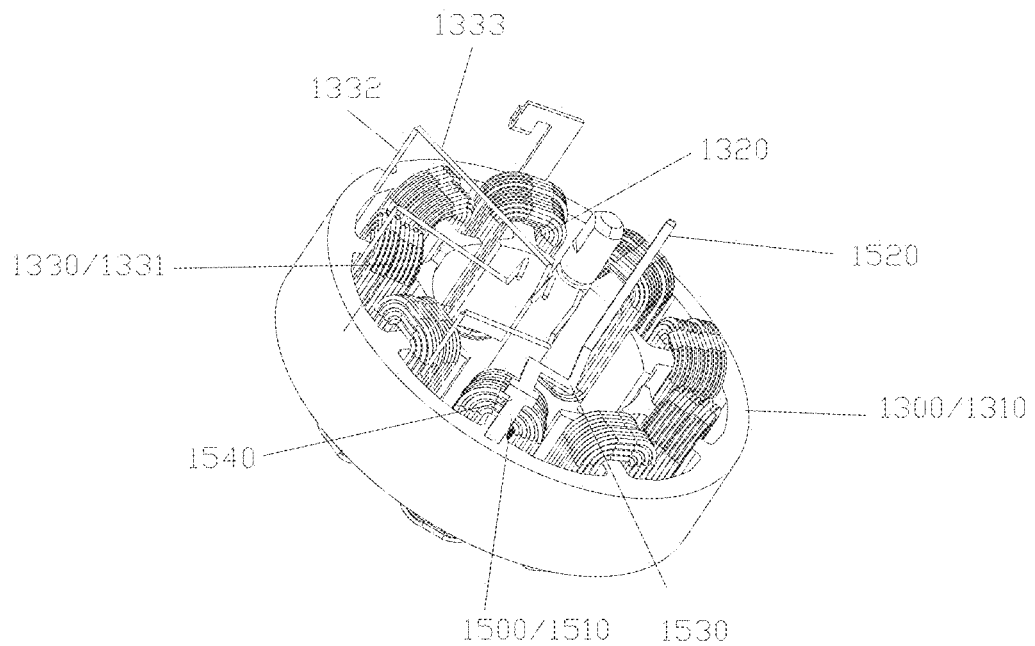
FIG. 7 is a schematic three-dimensional structural view of a stator assembly.

Referring to FIG. 7, the stator assembly 1300 includes a stator core 1310, an insulating frame 1320 and windings 1330, and the number of the windings 1330 is at least three. The insulating frame 1320 covers at least part of a surface of the stator core 1310, and the windings 1330 are wound around the insulating frame 1320. In a specific embodiment, the stator assembly 1300 includes nine windings 1330. Certainly, the stator assembly 1300 may also include other numbers of windings 1330, such as three, six and twelve. Referring to FIG. 4, FIG. 7, FIG. 8 and FIG. 9, in this embodiment, a first assembly is defined, which includes the stator core 1310, the insulating frame 1320 and the windings 1330. The insulating frame 1320 covers at least part of the surface of the stator core 1310, and a wire of the windings 1330 is wound around the insulating frame 1320. The stator assembly includes an inner housing 100, which is formed by injection molding with at least the first assembly as an insert. The inner housing 100 covers the stator core 1310, the insulating frame 1320 and the windings 1330 wound around the insulating frame 1320. The inner housing 100 described here is an injection-molded body. The inner housing 100 has the rotor chamber 1011, or a wall forming the rotor chamber 1011 includes a wall of the inner housing 100, or the inner housing 100 separates the first assembly from the rotor chamber 1011, so as to separate the fluid in the rotor chamber 1011 from the first assembly. Certainly, the pump shaft 16 may also be fixed with the inner housing 100 by injection molding, or the inner housing 100 may also be formed by injection molding with the first assembly and the pump shaft 16 as inserts. The inner housing 100 has an assembly hole for accommodating a part of the pump shaft 16, and the pump shaft 16 is fixed with the inner housing 100 by injection molding. The assembly hole of the pump shaft 16 described here may be a through hole or a blind hole. In this embodiment, the pump shaft 16 includes a first fixing section 161 fixed to the inner housing 100, a second fixing section 162 protruding from the pump housing 1100, and a first end portion fixed to the rotor assembly 1200. Correspondingly, the inner housing 100 has a first assembly hole 110 for accommodating the first fixing section 161, and the first fixing section 161 is fixed to the inner housing 100 by injection molding. Here, the first end means that an end face extends inward by a distance, and the "injection molding" may be injection molding for one time, or for two or more times, so that the inner housing 100 may be formed by one set of molds, which is beneficial to saving costs.

Figure 8:
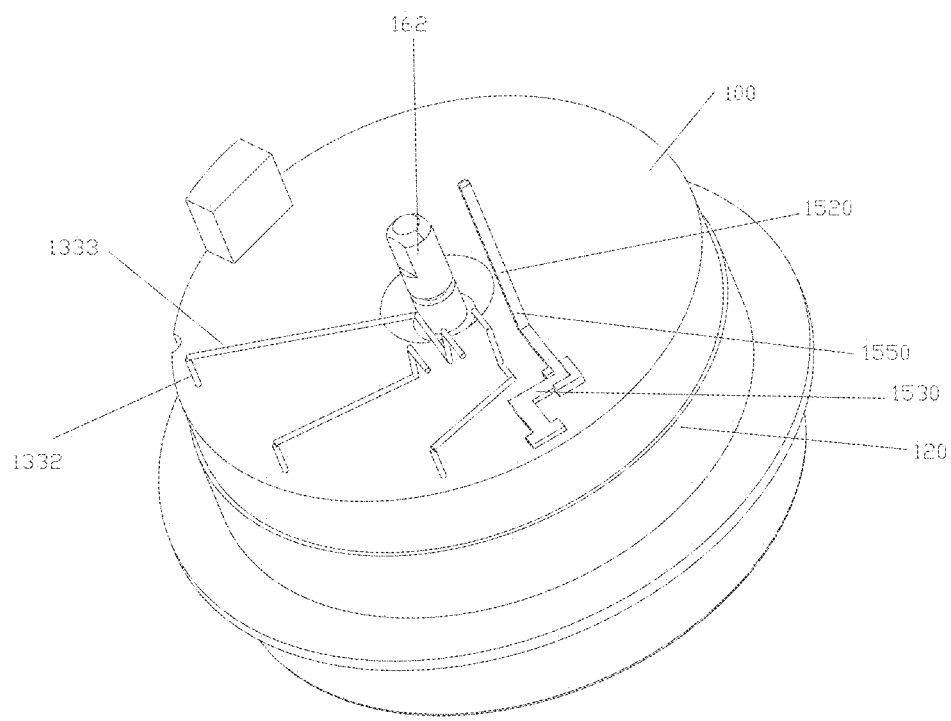
FIG. 8 is a schematic structural view of assembly of the stator assembly and an inner housing from a perspective.
Figure 9:
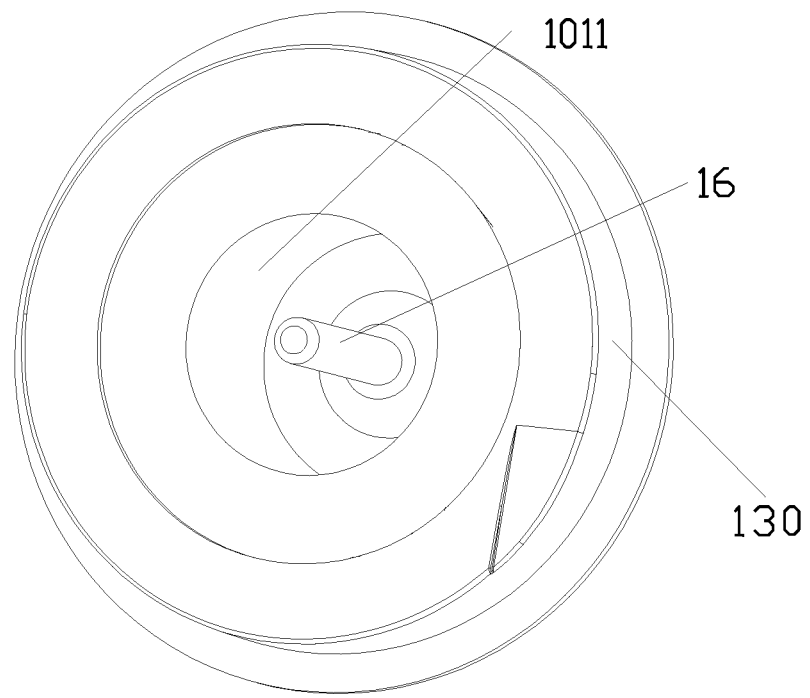
FIG. 9 is a schematic structural view of the assembly of the stator assembly and the inner housing from another perspective.

Referring to FIG. 7 to FIG. 8, the electric pump 1000 further includes a conductive member 1500, which has a first connecting section 1510 and a second connecting section 1520, and the second connecting section 1520 is of a needle shape and used for connecting with outside. In this embodiment, the first connecting section 1510 of the conductive member 1500 is in contact with the stator core 1310 for grounding the stator assembly 1300, thus it is beneficial to reducing the influence of accumulated charges on the electric pump 1000 and improving the electromagnetic compatibility of the electric pump 1000. Referring to FIG. 7, in this embodiment, the conductive member 1500 is a one-piece member. Certainly, the conductive member 1500 may also include two parts or more than two parts. The conductive member 1500 includes a first injection-molded section 1540, which is connected with the first connecting section 1510. The inner housing 100 has a first injection-molded hole for the first injection-molded section 1540 to penetrate, and the first injection-molded hole is formed with the first injection-molded section 1540 as an insert. The first connecting section 1510 of the conductive member 1500 is located in the inner housing 100, and a part of the conductive member 1500, such as the second connecting section 1500, is exposed outside the inner housing 100. The conductive member 1500 further includes a connecting portion 1530, and the connecting portion 1530 and the second connecting section 1520 are located at a different sides of the inner housing 100 along an axial direction of the electric pump 1000, the connecting portion 1530 is connected with the first injection-molded section 1540, and an extending direction of the connecting portion 1530 is perpendicular to an axis of the electric pump 1000. The conductive member 1500 is provided with the connecting portion 1530 for changing an extending position of the second connecting section 1520. In this embodiment, along a radial direction of the electric pump 100, the connecting section 1520 is arranged to be closer to the pump shaft than the first connecting section 1510.

Referring to FIG. 7, the wire of the windings 1330 includes a first section 1331, a second section 1332 and a third section 1333, and the second section 1332 is located between the first section 1331 and the third section 1333, and the first section 1331 is wound around the insulating frame 1320. The inner housing 100 has a second injection-molded hole formed with the wire of the winding 1330 as an insert, or the wire is one of the inserts for forming the inner housing by injection molding. The inner housing 100 has a second injection-molded hole for the wire to extend out of the inner housing 100, and the second section 1332 and the third section 1333 of the wire are exposed to the inner housing 100, or the wire has a part extending out of the inner housing 100.

Figure 1:
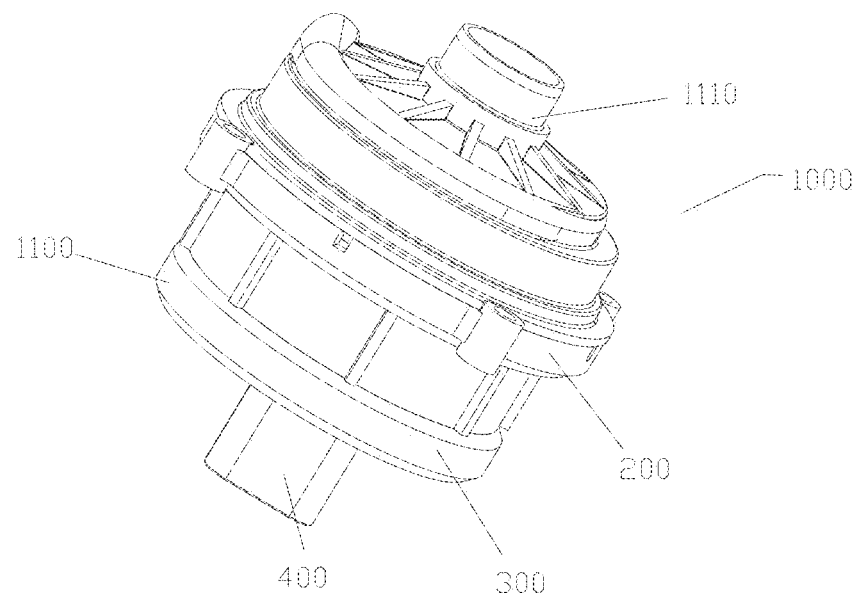
FIG. 1 is a schematic cross-sectional view of a first embodiment of an electric pump according to the present application.
Figure 2:
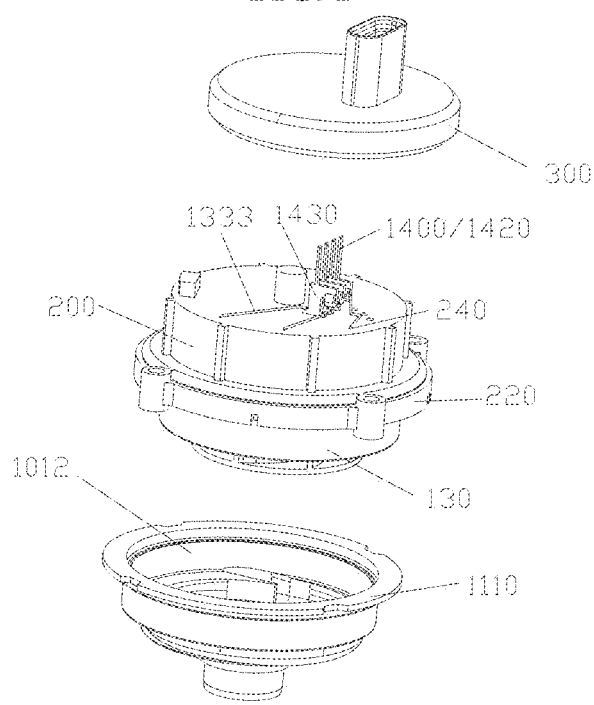
FIG. 2 is a schematic exploded structural view of the electric pump in FIG. 1.
Figure 3:
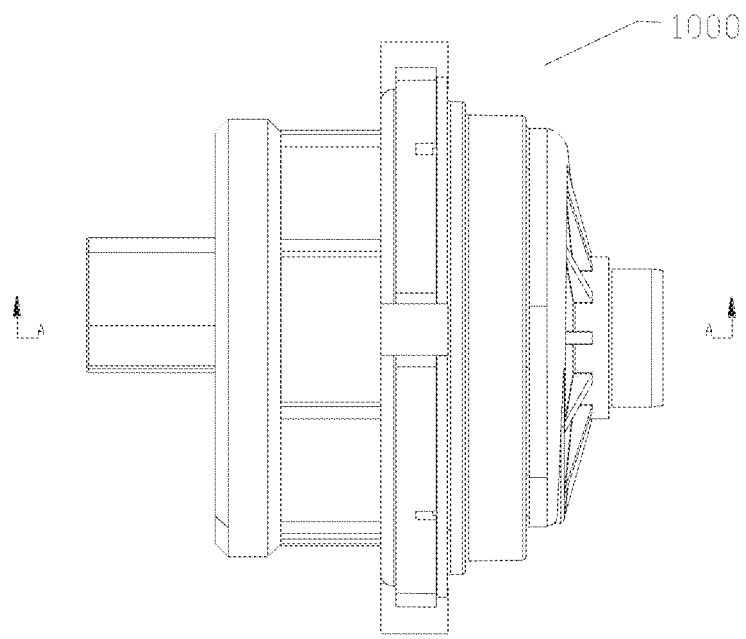
FIG. 3 is a schematic front view of the electric pump in FIG. 1.
Figure 4:
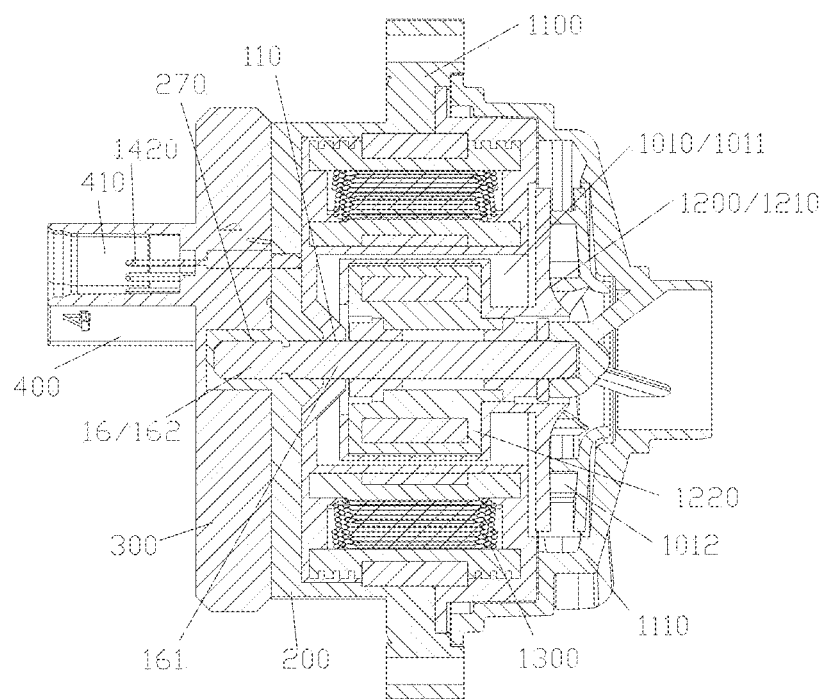
FIG. 4 is a schematic cross-sectional view of FIG. 3 taken along A-A.
Figure 5:
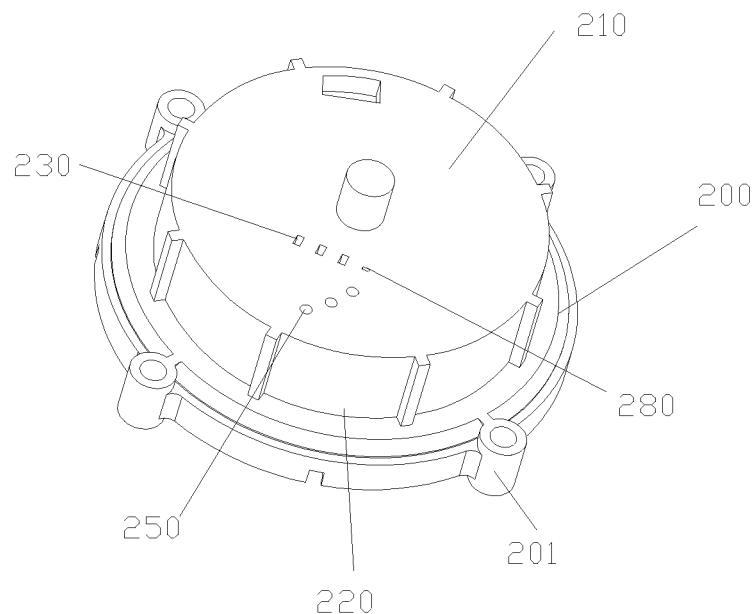
FIG. 5 is a schematic structural view of a first housing from a perspective.
Figure 11:
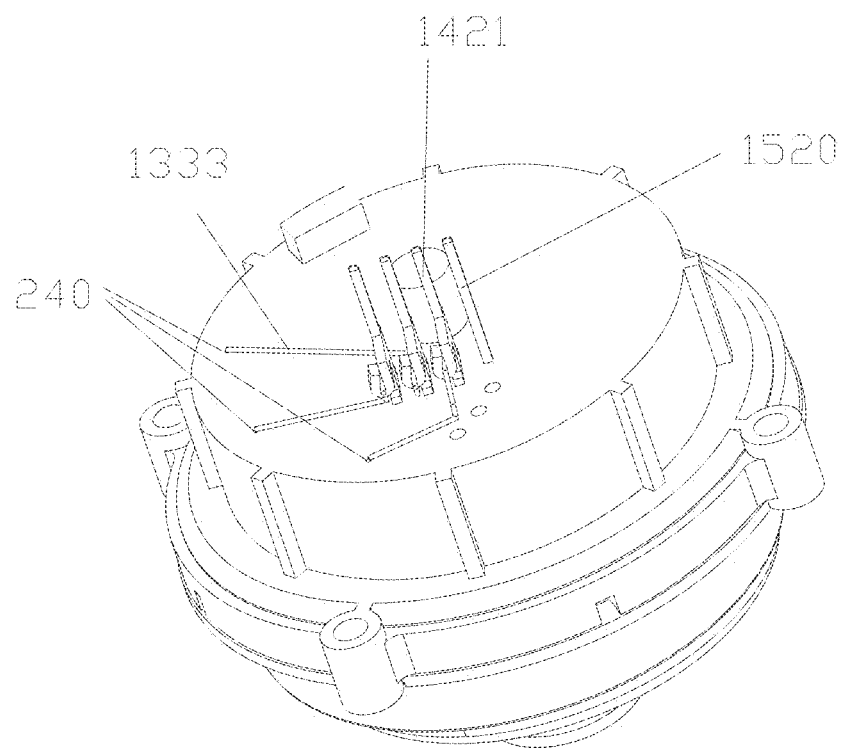
FIG. 11 is a schematic view showing assembly of the first housing, the pin and a wire.

Referring to FIG. 2, FIG. 11 and FIG. 4, the electric pump 1000 further includes a first housing 200 and a pin 1400, and the first housing 200 is fixedly connected with the stator assembly 1300. Specifically, the first housing 200 is fixedly connected with the stator assembly 1300 through the inner housing 100, and the first housing 200 is fixedly connected with the pin 1400. The first housing 200 has a wiring hole 240, and the second section 1332 of the wire is located in the wiring hole 240. The third section 1333 is exposed to the first housing 200, and a connecting section of the third section 1333 is fixed and electrically connected with a wire hanging portion 1430 of the pin 1400. The stator core 1310 and the wire hanging portion 1430 of the pin 1400 are located at different sides of the first housing 200. In this way, the wire of the winding 1330 passes through the first housing 200, and then is fixedly and electrically connected with the wire hanging portion 1430 of the pin 1400, and the pin 1400 is fixedly connected with the first housing 200, which simplifies a connection between the wire of the winding 1330 and the pin 1400, facilitates the assembly, and is beneficial to simplifying the structure of the electric pump 1000.

Figure 6:
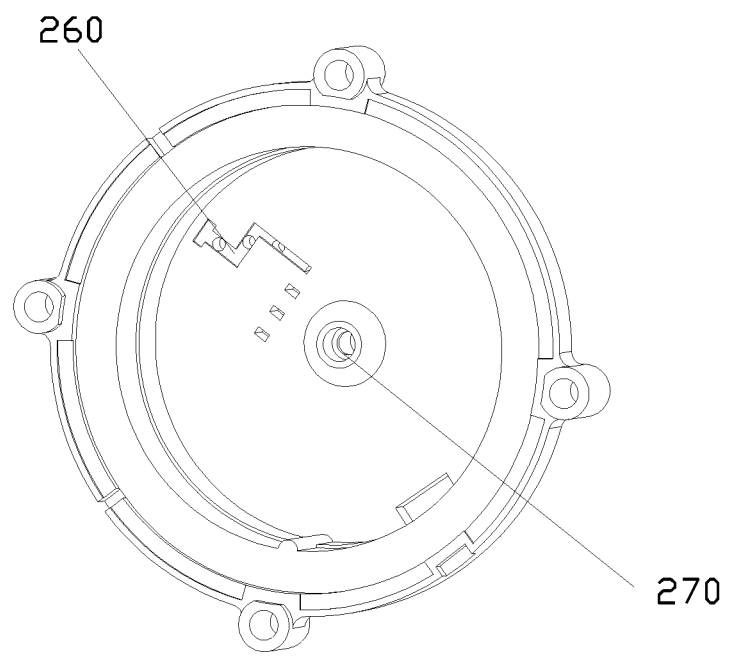
FIG. 6 is a schematic structural view of the first housing from another perspective.

In a specific embodiment, referring to FIG. 6, FIG. 8 and FIG. 11, the first housing 200 has the wiring hole 240. The second section 1332 of the wire is located in the wiring hole 240, and the third section 1333 of the wire is exposed to the first housing 200. The first housing 200 is fixed with the stator assembly 1300 by injection molding. Specifically, the first housing 200 is fixed with the inner housing 100 by injection molding and then is fixed with the stator assembly 1300 by injection molding, the second section 1332 of the wire is fixed with the first housing 200 by injection molding, and the wiring hole 240 is formed by injection molding with the second section 1332 of the wire as an insert. The conductive member 1500 includes a second injection-molded section 1550, and the first housing 200 has a conductive hole 280 through which the second injection-molded section 1550 passes. Since the connecting portion 1530 protrudes from the inner housing 100, the first housing 200 is formed with an accommodating groove 260 for accommodating the connecting portion 1530 during the injection molding. In addition, since the extension direction of the connecting portion 1530 is perpendicular to the axial direction of the electric pump 1000, in order to prevent the connecting portion 1530 from moving during the injection molding, a second tool is used to press the connecting portion 1530, and the second tool is used as an insert when the first housing 200 is formed by injection molding. After the first housing 200 is injection-molded, the first housing 200 has a first accommodating hole 250 for accommodating the second tool, and the first accommodating hole penetrates the first housing 200 and has an opening at a wall formed with the accommodating groove. Since the second fixing section 162 of the pump shaft 16 protrudes from the inner housing 100, the first housing 200 is formed by injection molding with the pump shaft 16 as an insert, the second fixing section 162 is fixed with the first housing 200 by injection molding, and the first housing 200 has a second assembly hole 270 for accommodating the second fixing section 162. In this way, the second fixing section 162 of the pump shaft 16 is fixed with the first housing 200 by injection molding, and the first fixing section 161 of the pump shaft 16 is fixed with the inner housing 100 by injection molding, which is beneficial to enhancing the fixing strength of the pump shaft 16 and the pump housing 1100.

Referring to FIG. 1 to FIG. 4 and FIG. 8, the pump housing 1100 further includes a pump cover 1110, which is fixed with the first housing 200 in a sealing manner. The pump cover 1110 has an impeller chamber 1012, an inlet and an outlet. Both of the inlet and the outlet are communicated with the impeller chamber 1012, and an impeller 1210 is located in the impeller chamber 1012. In this embodiment, along the axial direction of the electric pump 1000, an outer sidewall of the inner housing 100 includes a first sidewall 120 and a second sidewall 130, and the first sidewall 120 is embedded in the first housing 200 during injection molding, or the first sidewall 120 is covered in the first housing 200, and the second sidewall 130 is located in the impeller chamber 1012. The first housing 200 includes a bottom portion 210 and a side portion 220, and the bottom portion 210 of the first housing 200 has a wiring hole 240, a pin hole 230 and a third injection-molded hole for the conductive member 1500 to pass through. In the axial direction of the electric pump 1000, the side portion 220 extends from the bottom portion 210 towards the pump cover 1110, surrounds the first sidewall 110 of the stator assembly 1300, and is connected with the first sidewall 110 of the stator assembly 1300 in a sealing manner. The first housing 200 further includes a first sealing portion, and the pump cover 1110 includes a second sealing portion. The first sealing portion and the second sealing portion are fixed with each other by welding, bonding and the like in a sealing manner. The welding includes laser welding, friction welding and ultrasonic welding, which is not described in detail. Or, the electric pump 1000 includes a sealing member, which abuts against the first sealing portion and the second sealing portion, and the pump cover 1110 and the first housing 200 are fixedly connected with each other by bolts. This is beneficial to preventing the fluid in the pump chamber 1010 from leaking. Further, in order to enhance the sealing, at least one of the first housing 200 and the first sidewall 110 is provided with multiple concave portions, and an extending direction of the concave portion intersects with the axial direction of the electric pump 1000, preferably, the extending direction of the concave portion is perpendicular to the axial direction of the electric pump 1000. It can be known that when the first housing 200 is injection molded with the inner housing 100 as an insert, the other one of the first housing 200 and the first sidewall 110 is a convex portion, and the convex portion is fitted with the concave portion, which not only the sealing performance between the inner housing 100 and the first housing 200 is enhanced, but also the fixing strength between the inner housing 100 and the first housing 200 is increased.

The first housing 200 further includes a mounting portion 201 for mounting the electric pump 1000. Specifically, the mounting portion 201 includes multiple holes, which may be threaded holes or through holes, and are not described in detail.

Figure 10:
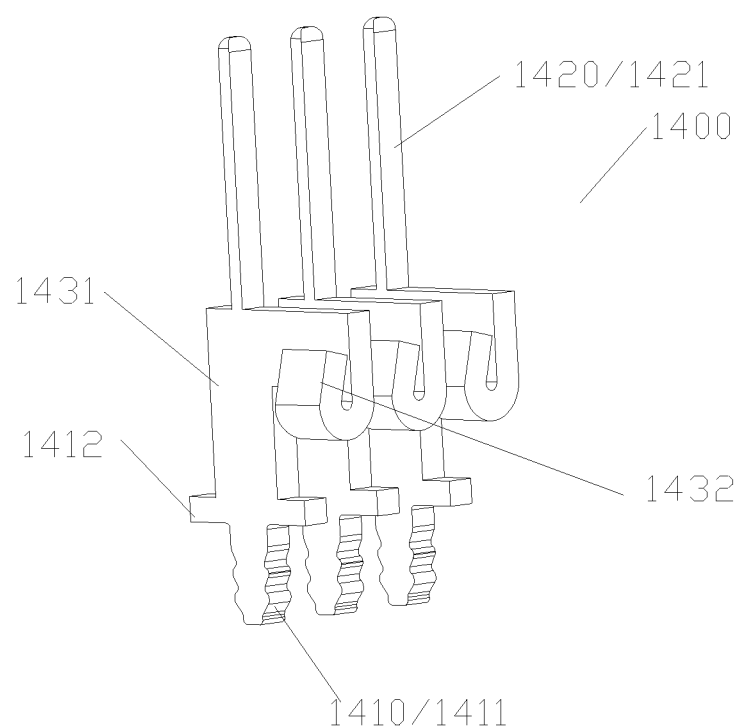
FIG. 10 is a schematic three-dimensional structural view of a pin.

Referring to FIG. 2, FIG. 10 and FIG. 11, the pin 1400 includes a fixing portion 1410, a wire hanging portion 1430 and a needle portion 1420. The wire hanging portion 1430 is located between the needle portion 1420 and the fixing portion 1410 along the axial direction of the electric pump 1000. The fixing portion 1410 of the pin 1400 is arranged to be closer to the stator core 1310 than the wire hanging portion 1430 of the pin 1400. The fixing portion 1410, the wire hanging portion 1430 and the needle portion 1420 may be of a one-piece structure or be fixed by welding through separate structures. The first housing 200 has a pin hole 230, which may be formed by injection molding with the first tool as an insert during the first housing 200 is injection-molded, and may also be formed by mechanical machining. The pin hole 230 may penetrate the first housing 200, or may be a blind hole. The fixing portion 1410 of the pin 1400 is located in the pin hole 230, and the opening of the pin hole 230 faces away from the stator core 1310. The pin 1400 may be in a interference fitting with a hole wall of the pin hole 230, and the pin 1400 may also be bonded and fixed with the first housing 200. The fixing between the pin 1400 and the first housing 200 may reduce the damage, for example, prevent the wire from breaking and facilitate the positioning of the pin 1400, to the electric pump 1000 when it is formed. In a specific embodiment, the fixing portion 1410 of the pin 1400 includes a toothed portion 1411 and a convex portion 1412, and as shown in FIG. 10, the convex portion 1412 protrudes relative to the toothed portion 1411, and the convex portion 1412 is arranged to be closer to the stator core 1310 than the toothed portion 1411 in the axial direction of the electric pump 1000. The toothed portion 1411 is located in the pin hole 230, and a part of the convex portion 1412 is located in the pin hole. The pin 1400 is limited by the convex portion 1412. The wire hanging portion 1430 includes an extension portion 1431 and a bending portion 1432, and the extension portion 1431 connects the fixing portion 1410 and the needle portion 1420, and the bending portion 1432 is bent relative to the extension portion 1431. There is a space between the bending portion 1432 and the extension portion 1431 to accommodate a part of the third section 1333, and a connecting end of the third section 1333 is fixed and electrically connected with the wire hanging portion 1430. In a more specific embodiment, along the axial direction of the electric pump 1000, the wiring hole 240 extends through the first housing 200, and the stator core 1310 and the wire hanging portion 1430 of the pin 1400 are located at opposite sides of the first housing 200. The needle portion 1420 includes a vertical section 1421, and compared to that the needle portion 1420 is perpendicular to the axial direction of the electric pump 1000 or has other angle relative thereto, an extension direction of the vertical section 1421 is parallel to the axial direction of the electric pump, so that the radial size of the electric pump 1000 can be reduced. In addition, referring to FIG. 12 and FIG. 13, the needle portion 1420 may further include a vertical section 1421 and a horizontal section 1422, and the vertical section 1421 extends parallel to the axial direction of the electric pump 1000, and the horizontal section 1422 extends perpendicular to the axial direction of the electric pump 1000, so that the vertical section 1421 is closer to the wire hanging portion 1430 than the horizontal section 1422 along the axial direction of the electric pump 1000. In this way, the direction of the joint portion 400 of the electric pump 1000 may be adjusted based on actual needs, which is convenient for mounting and also improves the applicability of the electric pump 1000.

Figure 12:
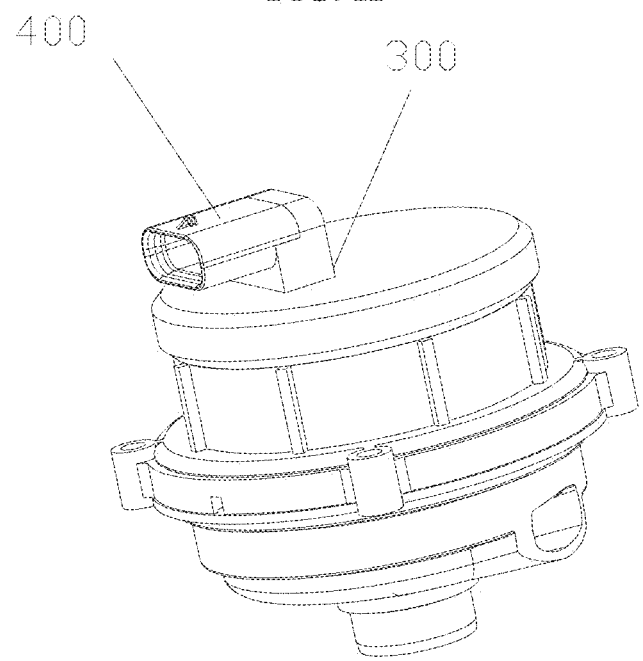
FIG. 12 is schematic cross-sectional view of a second embodiment of the electric pump according to the present application.
Figure 13:
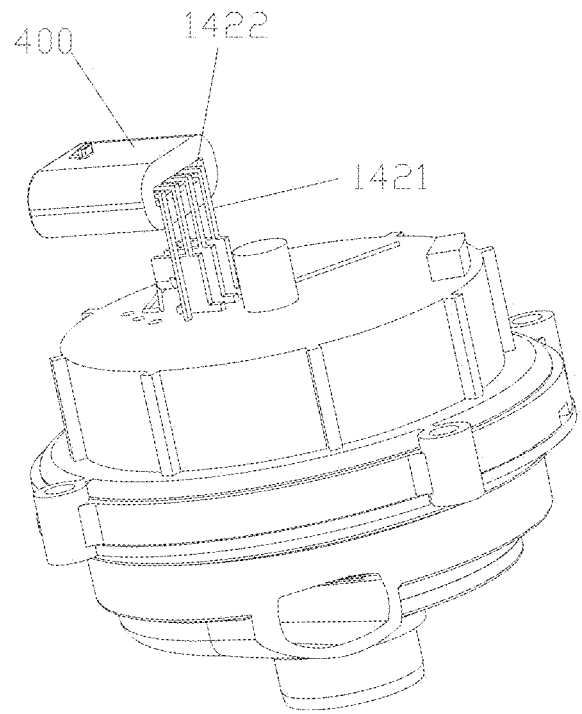
FIG. 13 is a schematic structural view of FIG. 12 with a second housing being removed.
Figure 14:
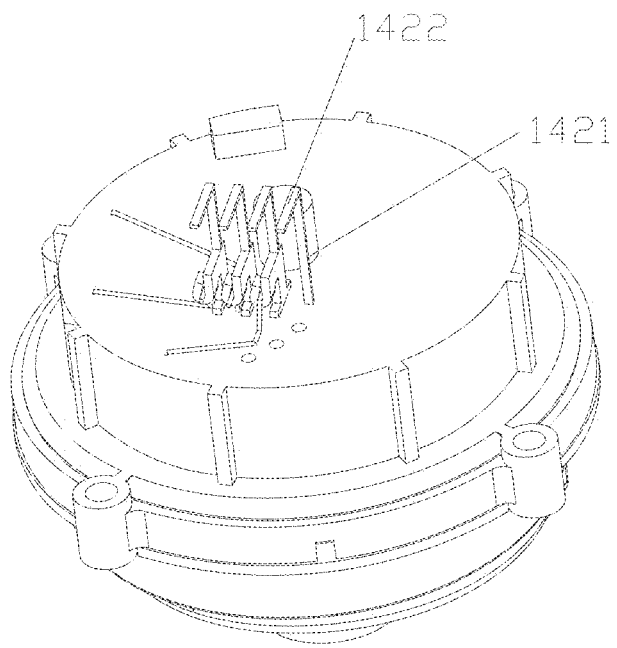
FIG. 14 is a schematic structural view of FIG. 13 with a joint portion being removed.

Referring to FIG. 2, FIG. 12 and FIG. 13, the electric pump 1000 includes a second housing 300, which is formed by injection molding with at least the pin 1400 and the conductive member 1500 as inserts. The third section 1333 of the wire is also located in the second housing 300, which is fixed with the pin 1400 and the first housing 200 by injection molding. It can be known that the second housing 300 is fixedly connected with the first housing 200 by injection molding. The second housing 300 includes a joint portion 400, which is used to connect with the outside. The joint portion 400 has an accommodating chamber 410, at least part of the needle portion 1420 is located in the accommodating chamber 410, and the needle portion of the second connecting section is located in the accommodating chamber 410. In a specific embodiment, the pin 1400 only includes the vertical section 1421, and the joint portion 400 is formed by injection molding, or certainly, the joint portion 400 may also be an insert. During the injection molding, the joint portion 400 is an insert, and the second housing 300 is formed by injection molding with the connector 400, the pin 1400 and the conductive member 1500 as inserts. In another specific embodiment, the pin 1400 includes the vertical section 1421 and the horizontal section 1422, and in this case, the joint portion 400 is separated from the second housing 300, the joint portion 400 is an insert, and the joint portion 400 is fixed with the second housing 300 by injection molding.

In the above embodiment, the inner housing 100 is formed by injection molding with the first assembly as an insert, the first assembly is fixed to the inner housing 100 by injection molding, the first housing 200 is fixed to the inner housing 100 by injection molding, and the second housing 300 is formed by injection molding with the third section 1333 of the wire and the conductive member 1500 as inserts. In another embodiment of the electric pump 1000, the pump housing 1100 may not include the first housing 200, and the pin hole 230 is formed during the injection molding of the inner housing 100, the pin 1400 is fixed to the inner housing 100, and the second housing 300 is formed by injection molding with the pin 1400 and the conductive member 1500 as inserts, which is not described in detail.

It can be known that the pump housing 1100 includes the pump cover 1110, the first housing 200 and the second housing 300, and the stator assembly includes the inner housing 100, and the inner housing 100, the first housing 200 and the second housing 300 are formed by injection molding, and the inner housing 100, the first housing 200 and the second housing 300 are defined as an injection molded body. In this case, the electric pump 1000 includes the rotor assembly 1200, the stator assembly 1300, the pin 1400 and the injection-molded body, and the injection-molded body is formed by injection molding with at least the stator assembly 1300 and the pin 1400 as inserts, and the injection-molded body covers the stator assembly 1300. The electric pump 1000 has the rotor chamber 1011, the wall forming the rotor chamber 1011 includes the inner wall of the injection-molded body, and at least part of the rotor assembly 1200 is located in the rotor chamber 1011. The electric pump 1000 includes the joint portion 400, which is integrally formed with the injection-molded body or is fixed by injection molding, and the needle portion 1420 of the pin 1400 is located in the accommodating chamber 410 of the joint portion 400. The injection-molded body may be formed by injection molding for one time, or for two or more times. For example, in this embodiment, the injection-molded body is formed by injection molding for three times, the inner housing 100 is formed by injection molding for one time and is defined as a first injection-molded body, the first housing 200 is formed by injection molding for two times and is defined as a second injection-molded body, and the second housing 300 is formed by injection molding for three times and is defined as a third injection-molded body. The stator assembly 1300 and the pin 1400 are fixed by injection molding, the pump cover 1110 is fixed with the injection-molded body in a sealed manner, a part of the rotor assembly 1200 is located in the injection-molded body, and another part of the rotor assembly 1200 is located in the pump cover 1110. In this case, the electric pump 1000 has a simple structure and can be assembled in a relative simplified way. The injection-molded body may also be formed by injection molding for two times, the first housing 200 may not be formed by injection molding, and only the inner housing 100 and the second housing 300 need to be formed by injection molding respectively, which is not described in detail.

In another embodiment, the first housing 200 may also be fixed to the inner housing 100 after being formed by injection molding, and the fixing method may be adhesive-bonding or bolt connection, which is not described in detail.

An assembling method for an electric pump 1000 is further provided according to an embodiment of the present application, which is applied to the electric pump 1000. The electric pump 1000 includes a stator assembly 1300, a pin 1400, a rotor assembly 1200 and a pump housing 1100, and the pump housing 1100 includes an injection-molded body and a pump cover 1110. The assembling method for the electric pump 1000 includes following steps:

forming the injection-molded body with the stator assembly 1300 and the pin 1400 as inserts;

placing the rotor assembly 1200 in the rotor chamber 1011 of the injection-molded body;

fixedly connecting the pump cover 1110 and the injection-molded body.

The injection-molded body is formed with the stator assembly 1300 and the pin 1400 as inserts, and a rotor chamber 1011 is formed at the same time. The rotor assembly 1200 is fixedly connected with the pump cover 1110 after being placed in the rotor chamber 1011. The assembling method for the electric pump 1000 is relatively simple, and the structure of the electric pump 1000 thus formed is relatively simple.

In this embodiment, the injection-molded body includes a first injection-molded body, a second injection-molded body and a third injection-molded body. Forming the injection-molded body with the stator assembly 1300 and the pin 1400 as inserts at least includes:

forming the first injection-molded body by injection molding with the stator assembly 1300 as an insert; or,
forming the first injection-molded body by injection molding with the stator assembly 1300 and the pump shaft 16 as inserts; and or, forming the first injection-molded body by injection molding with the stator assembly 1300, the pump shaft 16 and the conductive member 1500 as inserts in a case that the electric pump 1000 includes the conductive member 1500, and the first connecting section 1510 of the conductive member 1500 is in contact with the stator core 1310;

forming the second injection-molded body by injection molding; specifically, forming the second injection-molded body with the wire and the conductive member 1500 as inserts; therefore, the second injection-molded body has a wiring hole 240 through which the wire passes, and the second injection-molded body has a third injection-molded hole through which the conductive member 1500 passes; when the pump shaft 16 has a part protruding from the first injection-molded body, the protruding part of the pump shaft 16 is also an insert for forming the second injection-molded body;

further, forming the second injection-molded body by injection molding also includes: forming the pin hole 230 with a first tool as an insert, and forming the first accommodating hole 250 with a second tool as an insert; where the second tool is used to limit the connecting portion 1530 of the conductive member 1500 to prevent the connecting portion 1530 from moving when the first housing 200 is injection-molded.

The second injection-molded body may be fixed to the first injection-molded body during injection molding. Certainly, the second injection-molded body may be formed first, and then the second injection-molded body may be fixedly connected to the first injection-molded body by welding, bonding or bolting.

The third injection-molded body is formed by injection molding. Specifically, the third injection-molded body is formed by injection molding with the pin 1400 and the conductive member 1500 as inserts;

before the third injection-molded body is formed by injection molding, the assembling method for the electric pump 1000 includes: fixing the pin 1400 to the pin hole 230, and fixing the wire to the wire hanging portion 1430 of the pin 1400.

When the pin 1400 includes the vertical section 1421, forming the second injection-molded body by injection molding includes forming the joint portion 400 by injection molding.

When the pin 1400 includes the vertical section 1421 and the horizontal section 1422, the assembling method for the electric pump 1000 further includes forming the joint portion 400;

in this case, forming the second injection-molded body by injection molding includes forming the second injection-molded body by injection molding with the connector 400, the pin 1400 and the conductive member 1500 as inserts.

It should be noted that the above embodiments are merely used to illustrate the present application and not to limit the technical solutions described in the present application. Although the present application has been described herein in detail with reference to the above embodiments, those of ordinary skill in the art should understand that those skilled in the art may still modify or equivalently replace the present application, and all technical solutions and its improvements that do not apart from the spirit and scope of the present application should be covered by the scope of the claims of the present application.

What is claimed is:

1. An electric pump, comprising a stator assembly, a first housing and a pin, wherein the stator assembly comprises a stator core, an insulating frame and a winding, the insulating frame covers at least part of a surface of the stator core, and a wire of the winding is wound around the insulating frame;

the first housing covers at least part of the stator assembly, wherein the first housing is formed by injection molding with at least the stator assembly as a first insert or the first housing and the stator assembly are separately arranged and fixedly connected with each other, and the first housing is provided with a pin hole, in which a fixing portion of the pin is located, and the wire is fixed and electrically connected with a wire hanging portion of the pin, wherein the wire of the winding comprises a first section, a second section and a third section, the first section is wound around the insulating frame, the first housing is provided with a wiring hole formed by injection molding with the second section as a second insert, and a connecting section of the third section is fixed and electrically connected with the wire hanging portion of the pin, wherein the electric pump further comprises a conductive member, which comprises a first connecting section, a second connecting section, a second injection-molded section and a connecting portion, wherein the injection-molded section is connected with the connecting portion and the second connecting section, the first connecting section is in contact with the stator core, the first housing has a conductive hole formed with the second injection-molded section as a third insert, and an extending direction of the connecting portion is perpendicular to an axial direction of the electric pump, and wherein the first housing is provided with an accommodating groove formed by injection molding with the connecting portion as a fourth insert and has a first accommodating hole, which penetrates the first housing and is provided with an opening on a wall where the accommodating groove is formed.

2. The electric pump according to claim 1, wherein the first housing is arranged to be separated from the stator assembly, the fixing portion of the pin is located in the pin hole, and an opening of the pin hole faces away from the stator core;

along the axial direction of the electric pump, the stator core and the wire hanging portion of the pin are located at opposite sides of the first housing respectively, the fixing portion of the pin is arranged to be closer to the stator core than the wire hanging portion of the pin, and a wiring hole penetrates the first housing, or, the first housing is formed by injection molding with at least the stator assembly as the first insert and has an injection-molded pin hole, in which the fixing portion of the pin is located, and the wire is fixed and electrically connected with the wire hanging portion of the pin.

3. The electric pump according to claim 2, wherein the fixing portion of the pin comprises a toothed portion and a convex portion, the convex portion protrudes relative to the toothed portion, the convex portion is arranged to be closer to the stator core than the toothed portion in the axial direction of the electric pump, the toothed portion is located in the pin hole, and a size of the convex portion is larger than a size of the opening of the pin hole.

4. The electric pump according to claim 3, wherein the wire hanging portion comprises an extension portion and a bending portion, the extension portion connects the fixing portion and a needle portion, the bending portion is bent relative to the extension portion, and a space is provided between the bending portion and the extension portion to accommodate the connecting section of the wire.

5. The electric pump according to claim 4, wherein the electric pump comprises a second housing which is fixed with a bottom portion of the first housing by injection molding, and the second housing is formed by injection molding with at least the pin and the second connecting section of the conductive member as inserts; and wherein the electric pump further comprises a joint portion, which is a part of the second housing or is fixed with the second housing by injection molding, and the joint portion is provided with an accommodating cavity, in which a needle portion of the pin and a needle section of the second connecting section of the conductive member are located.

6. The electric pump according to claim 3, wherein the electric pump comprises a second housing which is fixed with a bottom portion of the first housing by injection molding, and the second housing is formed by injection molding with at least the pin and the second connecting section of the conductive member as inserts; and wherein the electric pump further comprises a joint portion, which is a part of the second housing or is fixed with the second housing by injection molding, and the joint portion is provided with an accommodating cavity, in which a needle portion of the pin and a needle section of the second connecting section of the conductive member are located.

7. The electric pump according to claim 2, wherein the electric pump comprises a second housing which is fixed with a bottom portion of the first housing by injection molding, and the second housing is formed by injection molding with at least the pin and the second connecting section of the conductive member as inserts; and wherein the electric pump further comprises a joint portion, which is a part of the second housing or is fixed with the second housing by injection molding, and the joint portion is provided with an accommodating cavity, in which a needle portion of the pin and a needle section of the second connecting section of the conductive member are located.

8. The electric pump according to claim 1, wherein the first housing comprises a bottom portion and a side portion, wherein the bottom portion of the first housing is provided with the wiring hole, the pin hole and the conductive hole, and the side portion extends from the bottom portion along the axial direction of the electric pump;
the stator assembly comprises an inner housing, wherein the inner housing is formed by injection molding with the stator core, the insulating frame and the winding as inserts, and the inner housing comprises a first sidewall, the first sidewall of the inner housing is connected with a first sidewall of the stator assembly in a sealing manner.

9. The electric pump according to claim 1, wherein the electric pump comprises a second housing which is fixed with a bottom portion of the first housing by injection molding, and the second housing is formed by injection molding with at least the pin and the second connecting section of the conductive member as inserts; and wherein the electric pump further comprises a joint portion, which is a part of the second housing or is fixed with the second housing by injection molding, and the joint portion is provided with an accommodating cavity, in which a needle portion of the pin and a needle section of the second connecting section of the conductive member are located.

10. The electric pump according to claim 9, wherein the needle portion comprises a vertical section, the vertical section extends parallel to the axial direction of the electric pump, the joint portion is the part of the second housing, the joint portion is formed by injection molding with the needle portion as a fifth insert, and an opening direction of the accommodating cavity is parallel to the axial direction of the electric pump;
or, the needle portion comprises the vertical section and a horizontal section, the vertical section extends parallel to the axial direction of the electric pump, and the horizontal section extends perpendicular to the axial direction of the electric pump, the joint portion is fixed with the second housing by injection molding, the second housing is formed by injection molding with the needle portion as a sixth insert, and the opening direction of the accommodating cavity is perpendicular to the axial direction of the electric pump.

11. A method for assembling the electric pump according to claim 1, wherein the electric pump comprises the stator assembly, the pin, a rotor assembly and a pump housing, and the pump housing comprises an injection-molded body and a pump cover, and the method for assembling the electric pump comprises:
forming the injection-molded body with the stator assembly and the pin as inserts;
placing the rotor assembly in a rotor chamber of the injection-molded body;
fixedly connecting the pump cover and the injection-molded body.

12. The method for assembling the electric pump according to claim 11, wherein the injection-molded body comprises a first injection-molded body, a second injection-molded body and a third injection-molded body, and forming the injection-molded body with the stator assembly and the pin as inserts at least comprises:
forming the first injection-molded body by injection molding with the stator assembly as the first insert; or, the electric pump comprises a pump shaft, forming the first injection-molded body by injection molding with the stator assembly and the pump shaft as inserts; the electric pump comprises the conductive member, and the first connecting section of the conductive member is in contact with the stator core, forming the first injection-molded body by injection molding with the stator assembly, the pump shaft and the conductive member as inserts;
forming the second injection-molded body by injection molding: forming the second injection-molded body with the wire and the conductive member of the winding as inserts; or, the electric pump comprises the pump shaft, and when the pump shaft has a part protruding from the first injection-molded body, the second injection-molded body is formed with the protruding part, the wire and the conductive member as inserts; and;
forming the third injection-molded body by injection molding with the pin and the conductive member as inserts.

13. The method for assembling the electric pump according to claim 12, wherein forming the second injection-molded body by injection molding further comprises: forming the pin hole with a first tool as a fifth insert, and forming a second accommodating hole with a second tool as a sixth insert.

14. The method for assembling the electric pump according to claim 13, wherein before the third injection-molded body is formed by injection molding, the method for assembling the electric pump comprises: fixing the pin to the pin hole, and fixing the wire to the wire hanging portion of the pin.

15. The method for assembling the electric pump according to claim 14, wherein when the pin comprises a vertical section, forming the second injection-molded body by injection molding comprises forming a joint portion by injection molding;

or, when the pin comprise a vertical section and a horizontal section, the method for assembling the electric pump further comprise: forming the joint portion; and forming the second injection-molded body by injection molding comprises: forming the second injection-molded body by injection molding with the joint portion, the pin and the conductive member as inserts.

\* \* \* \* \*